UNITED STATES PATENT OFFICE.

RALPH H. McKEE, OF RIDGEFIELD PARK, NEW JERSEY.

PROCESS OF MAKING PHENOL.

1,312,127.     Specification of Letters Patent.     Patented Aug. 5, 1919.

No Drawing.     Application filed November 17, 1917. Serial No. 202,548.

*To all whom it may concern:*

Be it known that I, RALPH H. McKEE, a citizen of the United States, residing at Ridgefield Park, in the county of Bergen and State of New Jersey, have invented certain new and useful Improvements in Processes of Making Phenol, of which the following is a specification.

My invention relates to an improved process of making phenol.

Important objects of my invention are the provision of improvements in processes of producing phenol, beta naphthol, etc., as heretofore and now practised, serving to overcome certain disadvantages thereof and particularly to avoid present benzol fire risks incident to benzol extraction; to avoid the loss of phenol when undissolved sodium sulfite is filtered off; to obtain in the practice of the process sodium sulfite which is white and of a commercial quality; to transform substantially 60% of the sodium sulfite produced in the process into caustic soda; to avoid the discharge of objectionable waste liquor into water courses; to avoid loss of phenol in waste liquor; to distil an intermediate product with steam rendering it practicable to employ a cheaper apparatus than is ordinarily employed in connection with benzol extraction and with less cost of operation; to recover substantially all of the sodium salts as caustic soda and sodium sulfite for reuse, thereby avoiding the necessity for the purchase of these relatively expensive sodium compounds; and to cheapen and improve the process by employing in one step of such process calcium sulfite and calcium carbonate produced in another step, whereby the employment of limestone or lime may be dispensed with and sulful dioxid along with carbon dioxid produced for use in the process, which mixture has advantages over carbon dioxid alone in the neutralization of sodium phenolate and caustic soda, as in such neutralization one molecule of sulfur dioxid will do the work of two molecules of carbon dioxid.

Other objects and advantages of my improved process will be apparent from the following description.

In the preferred practice of my process, I employ the following steps, in the order stated:

Step 1.—Benzol is sulfonated in the well known or usual manner.

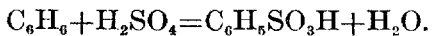

$$C_6H_6 + H_2SO_4 = C_6H_5SO_3H + H_2O.$$

Step 2.—The sulfonated benzol is then neutralized with calcium carbonate and calcium sulfite, preferably from or of the product of step 12, hereinafter referred to, thereby dispensing with the employment of lime or powdered limestone, which is used in the ordinary process of producing phenol. As a result of the chemical reactions set up in this step, sulfur dioxid and carbon dioxid are given off, which are collected, and used in step 9.

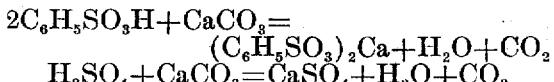
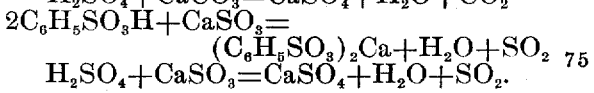

$$2C_6H_5SO_3H + CaCO_3 = (C_6H_5SO_3)_2Ca + H_2O + CO_2$$
$$H_2SO_4 + CaCO_3 = CaSO_4 + H_2O + CO_2$$
$$2C_6H_5SO_3H + CaSO_3 = (C_6H_5SO_3)_2Ca + H_2O + SO_2$$
$$H_2SO_4 + CaSO_3 = CaSO_4 + H_2O + SO_2.$$

Step 3.—The more or less liquid mass thus obtained, containing calcium benzene sulfonate in solution is then filtered, and the solid material obtained, consisting principally of gypsum, is discarded.

Step 4.—The filtrate obtained from step 3, containing calcium benzol sulfonate, is then treated with sodium sulfite produced in step 14 or sodium corbonate, or preferably a mixture of the two.

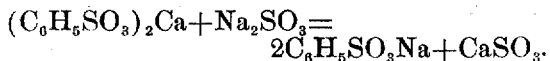
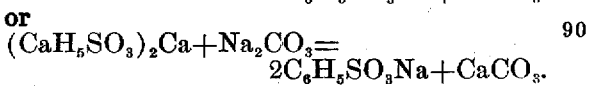

$$(C_6H_5SO_3)_2Ca + Na_2SO_3 = 2C_6H_5SO_3Na + CaSO_3.$$
or
$$(CaH_5SO_3)_2Ca + Na_2CO_3 = 2C_6H_5SO_3Na + CaCO_3.$$

Step 5.—The resultant liquid mass is then filtered to remove the precipitated calcium carbonate or calcium sulfite or both contained therein.

Steps 2, 3, 4 and 5 may be combined and only one filtration made but the practice of the precess as given above is preferred.

Step 6.—The liquid mass or the sodium benzene sulfonate solution is then evaporated.

Step 7.—The sodium benzene sulfonate is then fused with caustic soda, preferably obtained from step 15.

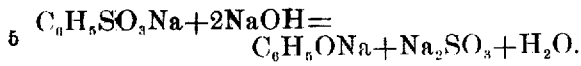

Step 8.—The resultant mass or melt is then dissolved in water or preferably in the distillate containing phenol from step 10, diluted with whatever additional water may be necessary to obtain the needed volume. By this means the phenol value of the distillate may be recovered, in the treatment by step 9.

Step 9.—The liquid mass or solution of step 8 is then neutralized, preferably by the use of sulfur dioxid and carbon dioxid, from step 2, supplemented if need be by carbon dioxid from the flue gas of the boilers, and the supernatent crude phenol is then withdrawn in the usual manner.

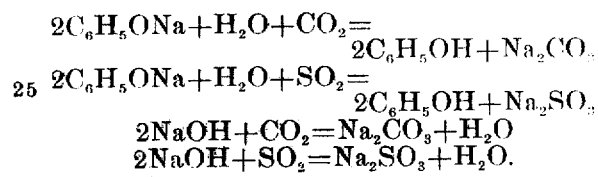

Use of an excess of $CO_2$ and $SO_2$ may produce further changes of the $Na_2CO_3$ first formed.

Step 10.—The waste sludge left on neutralization in step 9 is removed to a closed tank or still, connected with a condenser, and heated with steam, either by closed or opened coils, or both, until a portion of the volume of the sludge, say 25%, has been distilled over. This distillate will carry or contain most of the phenol dissolved in the sludge liquor, and its phenol value can be recovered by using this distillate, for dissolving the mass or melt, in step 8.

Step 11.—The waste sludge, after being subjected to the treatment of step 10, is causticized with lime, whereby approximately 94% of the sodium carbonate in the liquor is transformed into caustic soda, and about 60% of the sodium sulfite, in the liquor, is transformed into caustic soda.

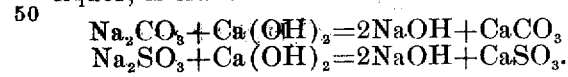

Step 12.—The liquor obtained from step 11 is filtered, preferably by means of a rotary filter, whereby the calcium carbonate and calcium sulfite are separated out, and the collected mixture of calcium sulfite and calcium carbonate is used instead of limestone, in step 2.

Step 13.—The caustic solution or liquor obtained from step 12 is next subjected to heat whereby it is suitably evaporated, the evaporation being preferably continued until the solution has a density of approximately 35°Bé. This concentration of the caustic solution causes the sodium sulfite remaining in the solution to precipitate out in a readily filtratable form, but owing to the solution being strongly caustic, the phenol which is present therein will remain in the concentrated caustic solution, and will not be vaporized upon the evaporation of such solution.

Step 14.—The concentrated caustic solution, containing the precipitated sodium sulfite, is filtered, whereby the precipitated sodium sulfite is removed from the caustic soda solution. This sodium sulfite may be employed in step 2, or being white and of a commercial quality, it may be sold.

Step 15.—The strong caustic soda solution obtained in step 14 may now be evaporated in the fusion kettle, or it may be evaporated in the customary way and introduced into the fusion kettle as solid caustic soda. The caustic soda so obtained is employed in step 7.

While I have described in detail the preferred manner of practising my process it is to be understood that the details of procedure may be varied and that known chemical equivalents of reagents used therein may be employed without departing from the spirit of my invention or the scope of the subjoined claims.

Having described my invention, I claim:

1. The herein described process of producing phenol; comprising (1) sulfonating benzol; (2) neutralizing the sulfonated benzol with calcium carbonate and calcium sulfite whereby sulfur dioxid and carbon dioxid are given off; (3) filtering the liquor thus obtained, containing calcium benzene sulfonate, to separate out the solid constituents; (4) subjecting the filtrate thus obtained to the action of a basic sodium compound; (5) filtering the liquid mass thus obtained to separate out the precipitated calcium salt; (6) evaporating the filtrate thus obtained, containing sodium benzene sulfonate; (7) fusing the sodium benzene sulfonate with caustic soda; (8) dissolving the fused mass in the distillate containing phenol produced in step 10; (9) neutralizing the liquor thus obtained by the use of a mixture of sulfur dioxid and carbon dioxid and withdrawing the supernatent crude phenol from the underlying sludge; and (10) heating the remaining sludge liquor to distil over a substantial portion of its volume, the distilled portion containing the greater portion of the phenol dissolved in the sludge liquor, said distilled portion being employed as a solvent in step 8.

2. The herein described process of producing phenol; comprising (1) sulfonating benzol; (2) neutralizing the sulfonated benzol with calcium carbonate and calcium sulfite, produced in step 12, whereby sulfur dioxid and carbon dioxid are given off; (3) filtering the liquor thus obtained, containing calcium benzene sulfonate, to separate out the solid constituents; (4) subjecting the filtrate thus obtained to the action of a basic sodium compound; (5) filtering the liquid mass thus obtained to remove the precipitated calcium compound produced; (6) evaporating the filtrate containing sodium benzene sulfonate; (7) fusing the sodium benzene sulfonate with caustic soda; (8) dissolving the fused mass in the distillate containing phenol obtained in step 10; (9) neutralizing the liquor thus obtained by the use of a mixture of sulfur dioxid and carbon dioxid and withdrawing the supernatent crude phenol from the underlying sludge; (10) heating the remaining sludge thus obtained to distil over a substantial portion of its volume, the distilled portion containing the greater portion of the phenol dissolved in the sludge liquor, said distilled portion being condensed for use as a solvent in step 8; (11) causticizing the sludge liquor thus treated with lime whereby the greater portion of the sodium sulfite, in the liquor, is transformed into caustic soda, and nearly all of the sodium carbonate in the liquor transformed into caustic soda, said liquor also containing some calcium carbonate and calcium sulfite; (12) filtering the liquor thus obtained to separate out the calcium carbonate and calcium sulfite; (13) evaporating the caustic liquor thus obtained until it has a density of approximately 35° Bé., and sodium sulfite is precipitated out; and (14) filtering the caustic liquor thus obtained for separating out the precipitated sodium sulfite.

3. The herein described process of producing phenol; comprising (1) sulfonating benzol; (2) neutralizing the sulfonated benzol with calcium carbonate and calcium sulfite produced in step 12, whereby sulfur dioxid and carbon dioxid are given off; (3) filtering the liquid thus obtained, containing calcium benzene sulfonate, to separate out the solid constituents; (4) subjecting the filtrate thus obtained to the action of sodium sulfite produced in step 14 and sodium carbonate; (5) filtering the liquid mass thus obtained to remove the precipitated calcium sulfite and calcium carbonate; (6) evaporating the filtrate containing sodium benzene sulfonate; (7) fusing sodium benzene sulfonate with caustic soda obtained from step 15; (8) dissolving the fused mass in the phenol containing distillate obtained in step 10; (9) neutralizing the liquor thus obtained by the use of sulfur dioxid and carbon dioxid from step 2 and withdrawing the supernatent crude phenol from the underlying sludge; (10) heating the remaining sludge obtained in step 9 to distil over a substantial portion of the volume of the sludge, the distilled portion containing the greater portion of the phenol dissolved in the sludge liquor, said distilled portion being used as a solvent in step 8; (11) causticizing the sludge liquor thus treated with lime whereby nearly all of the sodium carbonate in the liquor is transformed into caustic soda, and the greater portion of the sodium sulfite, in the liquor, is transformed into caustic soda, said liquor also containing some calcium carbonate and calcium sulfite; (12) separating out the calcium carbonate and calcium sulfite from the material obtained in step 11; (13) evaporating the caustic solution thus obtained until it has a density of approximately 35° Bé., whereby sodium sulfite is precipitated; (14) filtering the liquor thus obtained to remove the precipitated sodium sulfite; and (15) evaporating the caustic soda solution thus obtained for use in step 7.

4. In the herein described process of producing phenol from benzol, fusing sodium benzene sulfonate with caustic soda and dissolving the mass or melt in water containing phenol, the distillate containing the greater portion of the phenol contained in the sludge.

5. In the herein described process of producing phenol; heating sodium benzene sulfonate with caustic soda to fuse the mass; dissolving the fused mass in the water containing phenol produced by distilling a portion of the waste sludge liquor produced in a later stage of the process; neutralizing the liquor thus obtained by the use of sulfur dioxid and carbon dioxid; and withdrawing the resulting supernatent crude phenol from the underlying sludge and heating the waste sludge liquor thus obtained to distil over a substantial portion of its volume, the distilled portion containing the greater portion of the phenol dissolved in the sludge liquor, said distilled portion being condensed for use as a solvent of the sodium benzene sulfonate caustic soda mixture after fusion.

In testimony whereof I affix my signature in presence of two witnesses.

RALPH H. McKEE.

Witnesses:
MERLE B. SHAW,
LUANCHIA V. EATON.